US012370794B2

(12) United States Patent
Baldwin et al.

(10) Patent No.: US 12,370,794 B2
(45) Date of Patent: Jul. 29, 2025

(54) INK JET PRINTER AND METHOD OF MONITORING AN INK JET PRINTER

(71) Applicant: Linx Printing Technologies Limited, St Ives (GB)

(72) Inventors: Stephen Eric Baldwin, St Ives (GB); Bryn Jones, St Ives (GB); Thomas Michael Wake, St Ives (GB)

(73) Assignee: Linx Printing Techologies Limited (GB)

( * ) Notice: Subject to any disclaimer, the term of this patent is extended or adjusted under 35 U.S.C. 154(b) by 0 days.

(21) Appl. No.: 18/114,960

(22) Filed: Feb. 27, 2023

(65) Prior Publication Data

US 2023/0202170 A1 Jun. 29, 2023

Related U.S. Application Data

(63) Continuation of application No. PCT/GB2021/052176, filed on Aug. 23, 2021.

(30) Foreign Application Priority Data

Aug. 29, 2020 (GB) ...................................... 2013606

(51) Int. Cl.
*B41J 2/125* (2006.01)
*B41J 2/035* (2006.01)

(52) U.S. Cl.
CPC ............... *B41J 2/125* (2013.01); *B41J 2/035* (2013.01)

(58) Field of Classification Search
CPC ..... B41J 2/125; B41J 2/035; B41J 2/08; B41J 2/02; B41J 2002/022; B41J 29/393; G06F 3/121; G06F 11/0733
See application file for complete search history.

(56) References Cited

U.S. PATENT DOCUMENTS

| | | |
|---|---|---|
| 4,439,776 A | 3/1984 | Zeiler |
| 4,573,057 A | 2/1986 | Sutera et al. |

(Continued)

FOREIGN PATENT DOCUMENTS

| | | |
|---|---|---|
| CN | 109990331 A | 7/2019 |
| EP | 0 981 05 A2 | 1/1984 |

(Continued)

OTHER PUBLICATIONS

PCT International Search Report and Written Opinion for International Application No. PCT/GB2021/052176 mailing date Nov. 29, 2021, 14 pages.

(Continued)

*Primary Examiner* — Kristal Feggins
(74) *Attorney, Agent, or Firm* — Foley & Lardner LLP

(57) ABSTRACT

The current at a deflection electrode 23, 25 of an electrostatic deflection continuous inkjet printer 127 is monitored. If the current reaches a level higher than normal for a clean print head but below the current required to trigger an automatic shutdown, a warning is generated. The warning indicates that an automatic shutdown is likely to follow unless the print head is cleaned. This allows the operator to shut the printer down in a planned manner for cleaning. The warning may be provided at the printer 127 or it may be provided by an external system 121, 129 which allows personnel who are not at the printer to be alerted. The monitoring may be done by the printer or information about the deflection electrode current may be provided to an external system 121, 129 that performs the monitoring.

20 Claims, 8 Drawing Sheets

(56) References Cited

U.S. PATENT DOCUMENTS

| | | | |
|---|---|---|---|
| 4,812,673 | A | 3/1989 | Burchett |
| 4,994,821 | A | 2/1991 | Fagerquist |
| 2016/0098234 | A1 | 4/2016 | Weaver et al. |
| 2016/0361926 | A1 | 12/2016 | Okano et al. |
| 2017/0144448 | A1 | 5/2017 | Smith |

FOREIGN PATENT DOCUMENTS

| | | | |
|---|---|---|---|
| JP | S63-112159 | A | 5/1988 |
| WO | WO-2019/199674 | A1 | 10/2019 |

OTHER PUBLICATIONS

UK Search Report for Application No. GB2013606.5 mailing date Feb. 19, 2021, 6 pages.

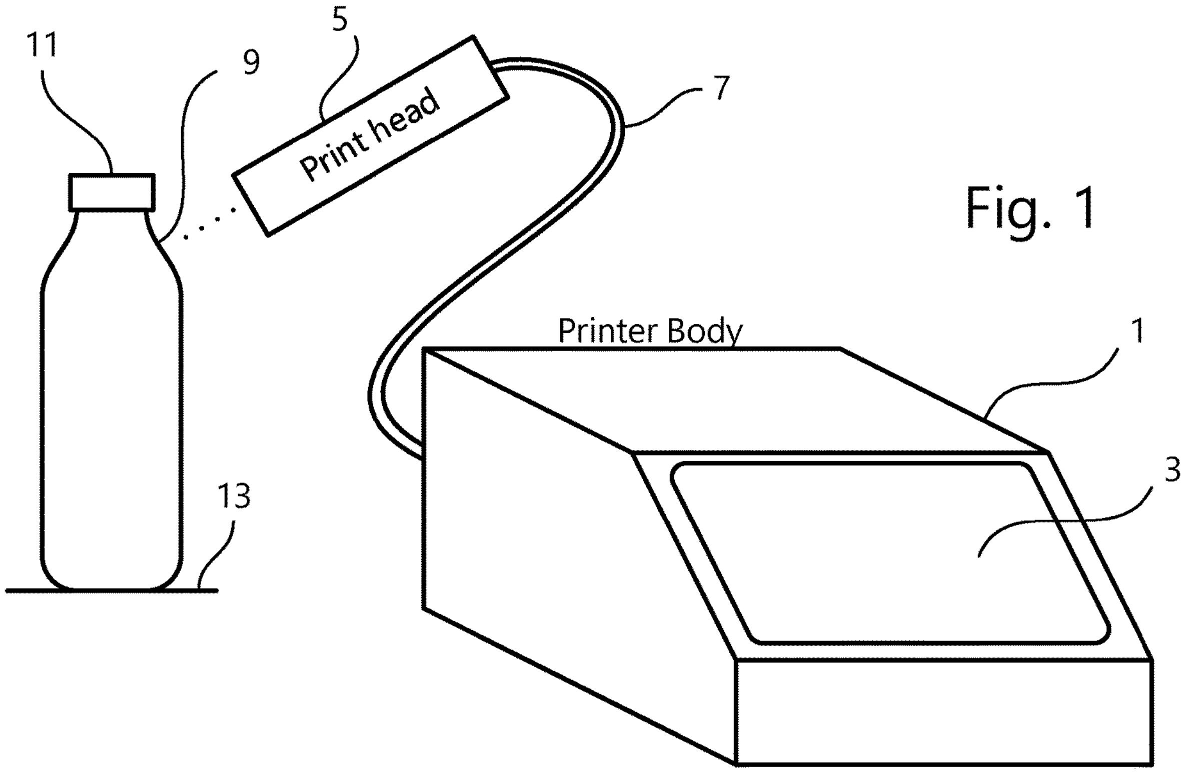
Fig. 1
Fig. 2
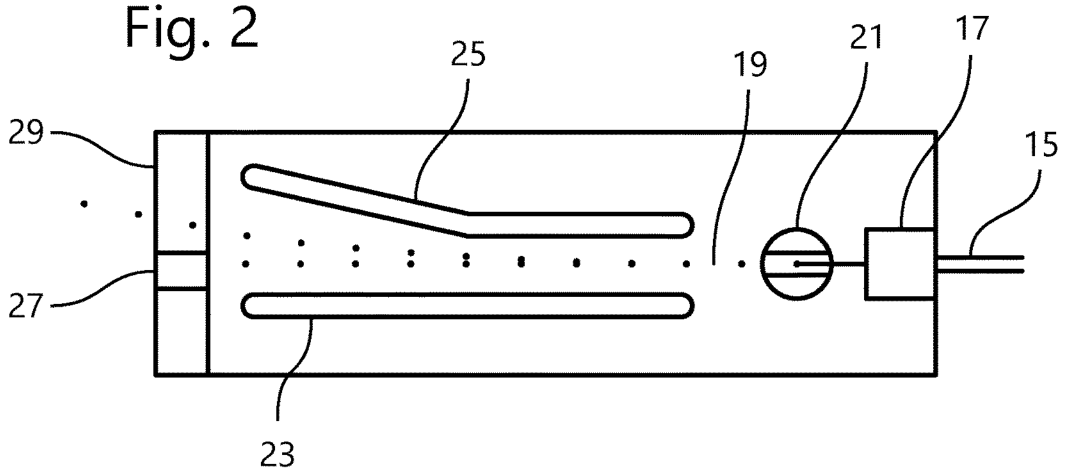
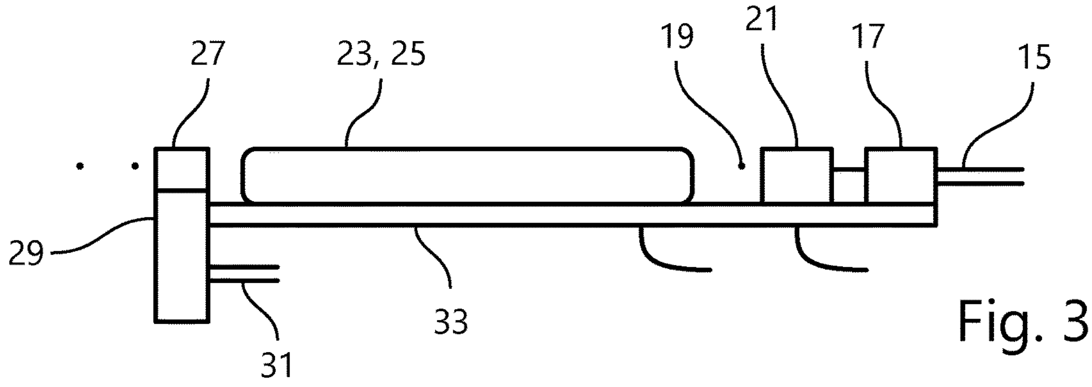
Fig. 3

Fig. 6
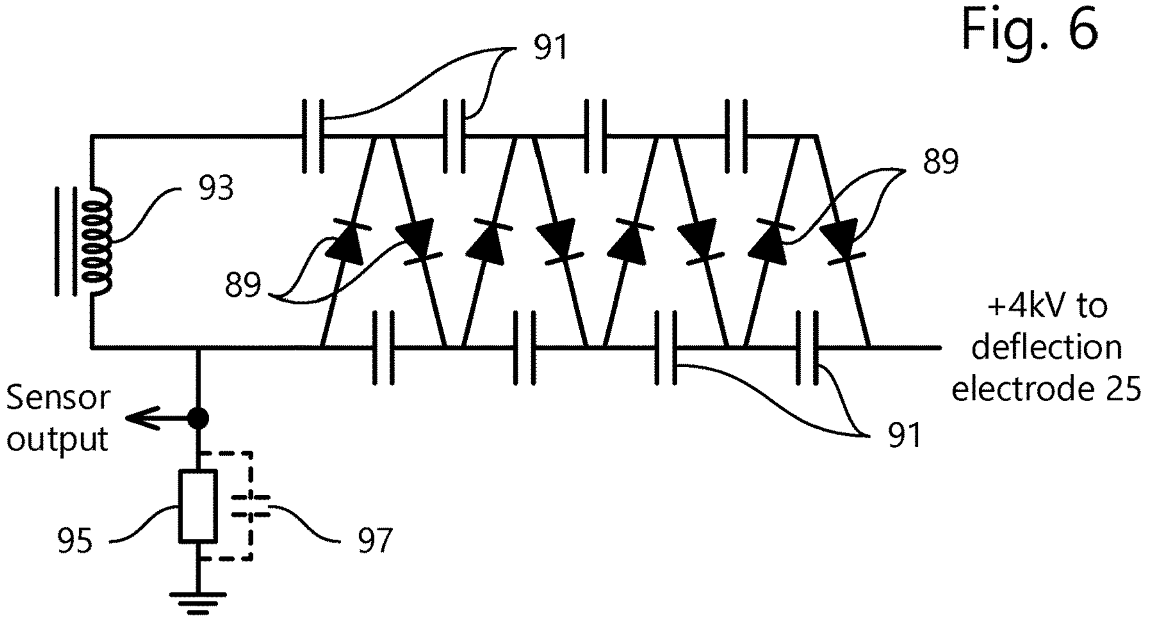
Fig. 7
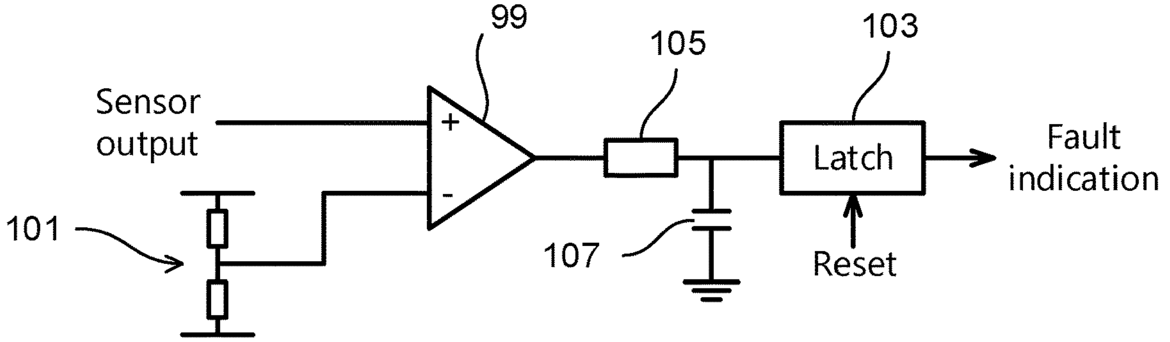
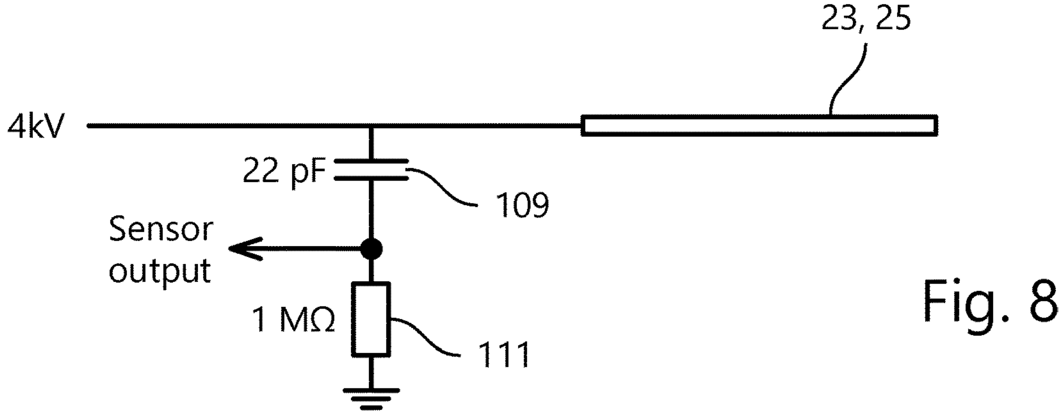
Fig. 8

INK JET PRINTER AND METHOD OF MONITORING AN INK JET PRINTER

CROSS-REFERENCE TO RELATED APPLICATIONS

The present application is a continuation of international application PCT/GB2021/052176, filed Aug. 23, 2021, which claims priority to GB App. No. 2013606.5, filed Aug. 29, 2020, both of which are incorporated herein by reference in their entireties and for all purposes.

FIELD OF THE INVENTION

The present invention relates to an electrostatic deflection continuous ink jet printer, for example an industrial printer suitable for printing onto a succession of objects carried past the printer on a conveyor in an industrial filling, packing or processing line. Typically the objects are products such as manufactured articles or packaged food stuffs and the printer is used to print product and batch information, "use by" dates etc. The present invention also relates to a printer body for such a printer and a method of monitoring such a printer.

In the operation of an electrostatic deflection continuous ink jet printer, a continuous jet of ink drops is formed at a print head of the printer. The print head comprises an arrangement of electrodes to trap electric charges on some or all of the ink drops and to create an electrostatic field to deflect the charged drops. Typically the arrangement of electrodes includes a charge electrode, the ink is electrically conductive, and the drops will be charged by the influence of a voltage on the charge electrode. The charged drops will usually be deflected by the electrostatic field generated by a pair of deflection electrodes. The drops are deflected in flight so that only some drops are used for printing. Drops of ink that are not required for printing are caught by a gutter and are normally returned to an ink tank within a printer body of the printer. Usually the print head is connected to the printer body by a flexible conduit (sometimes called an umbilical) which is typically from 1 m to 6 m long. The print head may be separable from the printer body. Usually the print head and the umbilical are provided as a print head assembly that can be connected to and disconnected from the printer body.

BACKGROUND

The gutter is normally held at a fixed electrical potential, usually ground, both by an electrical connection and because it is electrically connected via the conductive ink in the printer with the ink jet source in the print head (which is held at a fixed voltage in order to ensure that the voltage on the charge electrode induces an electrical charge in the jet). In order to keep the ink jet path as short as possible, the gutter is placed close to the deflection electrodes. However, the deflection electrodes usually have a voltage difference between them of several thousand volts and therefore there is a large voltage difference between the gutter and at least one of the nearby deflection electrodes. If there is a dielectric breakdown in the air gap between the gutter and one of the deflection electrodes, this can result in an arc current flowing at the deflection electrode. This may be made more likely by contamination on the gutter or on the deflection electrodes, typically from splashes of ink.

Electrical flow from the deflection electrodes can also happen in other ways. For example, splashes and contamination on a support surface that supports the electrodes and the gutter can lead to a tracking current flowing across the surface.

For reasons of electrical safety and because the printer cannot print correctly if there is a significant electrical current at a deflection electrode, an electrostatic deflection type continuous ink jet printer usually includes a system that monitors the electric supply to the deflection electrodes, e.g. by monitoring the supplied current or voltage, and automatically shuts the printer down if it detects a situation that meets a predetermined criterion that indicates that there may be a significant electrical current at a deflection electrode. The criterion may be a current above a threshold, a voltage below a threshold, or a transient change in the current or voltage that meets a pre-set limit.

It can be highly disruptive for the user if the printer is shut down automatically in response to a trip event, rather than being shut down as part of a planned operation. Supply companies may have contracts with their customers that require all goods to be marked in a particular way. This means that if the printer shuts down unexpectedly, it is necessary to stop the packing or marking line that includes the conveyor that carries the items that the printer is printing onto. The line cannot be restarted until the printer is working again or a replacement printer is installed.

In US 2019/0217609 a system is proposed with a capacitive sensor to detect voltage transients in the line to one of the deflection electrodes. In order to avoid shutting down the printer unnecessarily, the system seeks to distinguish between "false" trip events, which do not require the printer to be shut down, and "true" trip events which do require the printer to be shut down. Transients are only classified as "true" trip events if they last longer than a minimum duration and if they follow a previous transient with less than a maximum time interval.

US 2016/0098234 proposes a system for remote servicing an industrial printer such as a continuous ink jet printer. Sensor measurements (and also other data) are sent from the printer to a servicing centre. US 2016/0098234 lists a large number of sensor parameters that may be sent, including EHT parameters such as voltage, current, trip value and % of trip. Based on the sensor data and other data, a system at the servicing centre is configured to issue a fault or a warning if appropriate. A list of examples of faults and warnings is provided. It is suggested that the sensor data can be used to predict potential failures or other faults. For example, if pump speed is changing over time it may indicate that the pump is wearing and may fail, or it may become known from historical data that if the pressure drop across a filter reaches a certain point the printer will fail within a week 99% of the time. A table of example predictive faults is given, in which one entry gives "EHT % of trip value" as sensor data and "very dirty print head" as the corresponding potential fault.

SUMMARY OF THE INVENTION

An aspect of the present invention provides an electrostatic deflection continuous ink jet printer arranged to monitor a parameter indicating the current level or current transient at a deflection electrode and, if the parameter meets a condition that indicates a current level or current transient that is higher than the background level for a clean print head but is lower than a level that triggers an automatic shut-down of printing operations of the printer, output a warning that an automatic shut-down of printing operations is predicted to be likely.

Another aspect of the present invention provides a monitoring system arranged to receive data from an electrostatic deflection continuous ink jet printer indicating the current level or current transient at a deflection electrode of the printer and, if the data meets a condition that indicates a current level or current transient that is higher than the background level for a clean print head but is lower than a level required to trigger an automatic shut-down of printing operations of the printer, output a warning that an automatic shut-down of printing operations of the printer is predicted to be likely.

Another aspect of the present invention provides a method comprising monitoring a parameter indicating the current level or current transient at a deflection electrode of an electrostatic deflection continuous ink jet printer and, if the parameter meets a condition that indicates a current level or current transient that is higher than the background level for a clean print head but is lower than a level that triggers an automatic shut-down of printing operations of the printer, outputting a warning that an automatic shut-down of printing operations of the printer is predicted to be likely. The method may be carried out in the printer or at a system external to the printer that receives data indicating the current level or current transient at a deflection electrode from the printer.

Another aspect of the present invention provides an electrostatic deflection continuous ink jet printer comprising:

a high-voltage supply system for providing a high voltage to a deflection electrode in a print head of the electrostatic deflection continuous ink jet printer;

a monitoring system arranged to monitor at least one fault parameter indicative of the current drawn by the said deflection electrode, and output a fault indication in the case that the said at least one fault parameter meets a predetermined fault criterion; and a controller arranged to respond to the fault indication by shutting down printing operations of the printer or by removing the said high voltage from the deflection electrode, characterised in that the monitoring system is arranged to monitor at least one warning parameter indicative of a property of the current drawn by the said deflection electrode and, in the case that the said at least one warning parameter meets a predetermined warning criterion, output a warning that an output of the fault indication is anticipated, and the printer comprises at least one of (a) a transmitter connected to receive the warning and transmit the warning out of the printer, and (b) an output device coupled to output the warning in a visible and/or audible manner.

Another aspect of the present invention provides a method of operating an electrostatic deflection continuous ink jet printer comprising:

providing a high voltage to a deflection electrode in a print head of the electrostatic deflection continuous ink jet printer;

monitoring at least one fault parameter indicative of the current drawn by the said deflection electrode, and outputting a fault indication in the case that the said at least one fault parameter meets a predetermined fault criterion; and responding to the fault indication by shutting down printing operations of the printer or by removing the said high voltage from the deflection electrode, characterised by monitoring at least one warning parameter indicative of a property of the current drawn by the said deflection electrode and, in the case that the said at least one warning parameter meets a predetermined warning criterion, transmitting out of the printer a warning that an output of the fault indication is anticipated and/or outputting a visible and/or audible warning that an output of the fault indication is anticipated Preferably the warning also includes an indication that cleaning of the print head or of a part thereof should be carried out.

The at least one fault parameter should comprise a value indicating the level of current or the level or duration of transient changes in the current drawn by the deflection electrode. The at least one fault parameter may comprise a value representing something other than the current but which may be expected to indicate the current. For example, the high voltage supply system may be unable to maintain the correct voltage output if significant current is drawn from it. Additionally, a high value resistor may be provided between the high voltage supply system and the deflection electrode to provide electrical safety, and this causes the voltage at the electrode to drop if the current increases. Therefore the level of voltage or the level or duration of transient changes in the voltage at the deflection electrode may be used to indicate the level of current or the level or duration of transient changes in the current.

The fault criterion should be chosen so that the fault indication is given if the printer needs to be shut down because of arcing from the deflection electrode. Therefore the fault criterion will normally be met if the fault parameter indicates a high current level or a sudden increase in current, preferably with filtering or other processing to remove high frequency noise.

It has been found that the current drawn by the deflection electrode changes from its normal state, e.g. by increasing or becoming more variable, before arcing from the deflection electrode occurs. Therefore by monitoring a property of the current it is possible to give advance warning that a protective shut-down of the printer is expected.

The warning criterion should be chosen so that the warning is given in circumstances where the state of the current drawn by the deflection electrode is different in some aspect from the normal state of the current in fault-free operation, and the difference tends to predict that the fault criterion will be met unless preventative action is taken.

The at least one warning parameter may comprise a value indicating the level of current or the level or duration of transient changes in the current drawn by the deflection electrode or the level of voltage or the level or duration of transient changes in the voltage at the deflection electrode. The at least one warning parameter may be the same as, or share a parameter with, the at least one fault parameter. In this case, the warning criterion might be met when the shared parameter is outside its range for normal fault-free operation of the printer but has not yet reached the fault criterion. In general, the warning criterion should be such that it can be met under circumstances in which the fault criterion is not met.

The at least one warning parameter may comprise a measured value or it may comprise the result of processing one of more measured values. For example, if a value representing the level of current is measured, the warning parameter may comprise an average of the measured value over a pre-set time period, possibly a moving average, or the range of differences of the measured value within a pre-set time period, or the root-mean-square or the average absolute value of the differences between successive measured values within a pre-set time period, or the average rate of change of the measured values during a pre-set time period. The warning criterion may be a complex criterion rather than a simple threshold. For example, the warning criterion may be met if any one occurs out of a set of conditions comprising: a measured value or an average of measured values exceeding a threshold (indicating an abnormally high current); the rate of change of measured values exceeding a threshold (indicating a suddenly rising current); and the range of differences between measured values or the root-mean-square or the average absolute value of the differences between successive measured values exceeding a threshold (indicating that the current level has become unstable) or some other pattern of current indicating an unstable level of current.

Typically the warning criterion will be met by a flow of current drawn by the deflection electrode or a change in the voltage supplied to the deflection electrode that is greater than would be expected under normal working conditions with a clean print head but is less than, or lasts for a shorter duration than, is sufficient to meet the fault criterion.

The monitoring system and the controller may each be implemented digitally at least in part, and the monitoring system and the controller may share a common digital processing system and be part of the printer's overall control system.

The monitoring system may comprise a common system that monitors both the at least one fault parameter and the at least one warning parameter or it may comprise separate subsystems one of which monitors the at least one fault parameter and the other of which monitors the at least one warning parameter. For example, the at least one warning parameter may be monitored digitally while the at least one fault parameter may be monitored by a hard-wired subsystem. The hard-wired subsystem may comprise a comparator circuit that receives a first input representing the at least one fault parameter and a second input representing the predetermined fault criterion, and outputs the fault indication if the level of the first input exceeds the second input.

The transmitter may configured to transmit wirelessly (e.g. by wireless connection to an Internet router or an intranet system, or over a cellular telephone network) and/or over a wired connection (e.g. via an Ethernet port or a USB port).

Typically the electrostatic deflection continuous ink jet printer will comprise an electrostatic deflection continuous ink jet print head that comprises an ink jet source (ink gun), a charge electrode for capturing electric charges on drops of ink as the ink jet separates into drops, a deflection arrangement, comprising the said deflection electrode, for creating an electric field that deflects charged ink drops, and a gutter for collecting drops of ink not used for printing. The ink collected by the gutter is normally returned to the printer body of the printer for re-use. The print head is usually connected to the printer body by a flexible umbilical that carries fluid lines and electrical lines between the print head and the printer body. The print head is usually separable from the printer body, typically at the point where the umbilical meets the printer body so that the print head and the umbilical jointly form a removable print head assembly.

In an embodiment, a second predetermined warning criterion is also used to provide a warning that an output of the fault indication is anticipated. The second predetermined warning criterion may relate to the at least one warning parameter but be defined differently from the first predetermined warning criterion. For example, one of the first and second predetermined warning criteria may comprise a condition for the value of the at least one warning parameter, or for the value of a parameter comprised in the at least one warning parameter, over a time period that is not used in the other of the first and second predetermined warning criteria.

For example, one of the first and second predetermined warning criteria may be met by a brief flow of current or change in voltage, suggesting momentary arcing between the deflection electrode and the gutter owing to a build-up of dried ink, and the other of the first and second predetermined warning criteria maybe met by a longer term flow of current or incorrect voltage, suggesting a tracking current across a dirty baseboard of the print head.

The warnings may provide an advance warning that the fault indication is likely to be given unless corrective action (such as cleaning the deflection electrodes or cleaning the print head more generally) is taken promptly. This may enable the operator to carry out the corrective action during a forthcoming planned shutdown of the packing or marking line that includes the conveyor that carries the items that the printer is printing onto, or of no shutdown of the packing or marking line is planned for the immediate future, the operator can shut the line down in a controlled manner in order to carry out the corrective action. In this way, the warning may enable the operator to avoid the disruption of an automatic printer shutdown.

The warning may also include an indication a part of the print head that should be cleaned. For example, a warning given in response to meeting the first warning criterion may indicate that one or both of the deflection electrodes and other nearby components such as the gutter should be cleaned and a warning given in response to meeting the second warning criterion may indicate that a surface that connects one or both of the deflection electrodes to other components should be cleaned. By providing information about which part of the print head is most likely to need cleaning, the warning gains credibility and is more likely to be acted on. Also, it is more likely to result in the operator cleaning the part of the print head that is causing the detected deflection electrode current.

In another aspect of the present invention there is provided a predictive warning system comprising a receiver able to receive data transmitted by one or more electrostatic deflection continuous ink jet printers, processing apparatus connected to receive said data from the receiver and configured to respond, in the case that at least one warning parameter in said data meets a predetermined warning criterion, by outputting a warning that a shut-down of printing operations of the printer is anticipated, the at least one warning parameter being indicative of a property of the current drawn by a deflection electrode of an electrostatic deflection continuous ink jet printer. The predictive warning system may comprise a transmitter connected to transmit the warning e.g. to a monitoring station or to the user of the electrostatic deflection continuous ink jet printer to which the warning parameter relates or direct (for example by a message to a smartphone or other mobile device) to the operator of the printer or other on-site personnel.

The predictive warning system may be operated by the user of the one or more printers from which it receives the data, allowing the user to receive warnings at a different location from the printers or to monitor a plurality of printers from a single location. Alternatively the predictive warning system may be part of a remote monitoring system that enables another person, e.g. a manufacturer, supplier or maintenance provider, to provide a monitoring and maintenance service to one or more users of electrostatic deflection continuous ink jet printers.

The transmitter of the predictive warning system may transmit the warning as a message, e.g. by email, SMS, instant message or push notification stating that the printer to which the warning parameter relates is likely to shut down soon due to a deflection electrode trip and recommending that the deflection electrodes and/or other relevant parts of the print head are cleaned.

Another aspect of the present invention provides an electrostatic deflection continuous ink jet printer which is arranged to automatically cease printing in response to an excessive current flowing at a deflection electrode, and is arranged to output an advance warning, that the printer is likely to automatically cease printing, in response to a predetermined amount and/or pattern of current flowing at the deflection electrode that is more than the normal current flowing at the deflection electrode if the components of the print head of the printer are clean but is not an excessive current leading to the printer automatically ceasing printing.

Another aspect of the present invention provides a monitoring system that is arranged to receive data from an electrostatic deflection continuous ink jet printer indicating the current flowing at a deflection electrode of the electrostatic deflection continuous ink jet printer and to output an advance warning, that the printer is likely to automatically cease printing, in response to a determination by the system that the data indicates that the amount and/or pattern of current at the deflection electrode meets a predetermined criterion.

Another aspect of the present invention provides a method of operating an electrostatic deflection continuous ink jet printer comprising: automatically ceasing printing in response to an excessive current flowing at a deflection electrode; and outputting, in response to a predetermined amount and/or pattern of current flowing at the deflection electrode that is more than the normal current flowing at the deflection electrode if the components of the print head of the printer are clean but is not an excessive current leading to the printer automatically ceasing printing, an advance warning that the printer is likely to automatically cease printing.

Another aspect of the present invention provides a monitoring method comprising receiving, at a system external to an electrostatic deflection continuous ink jet printer, data indicating the current flowing at a deflection electrode of the electrostatic deflection continuous ink jet printer and responding to a determination by the system that the data indicates that the amount and/or pattern of current at the deflection electrode meets a predetermined criterion by outputting an advance warning that the printer is likely to automatically cease printing.

In a further aspect of the present invention, the current at a deflection electrode of an electrostatic deflection continuous ink jet printer is monitored. If the current reaches a level higher than normal for a clean print head but below the current required to trigger an automatic shutdown, a warning is generated. The warning indicates that an automatic shutdown is likely to follow unless the print head is cleaned. This allows the operator to shut the printer down in a planned manner for cleaning. The warning may be provided at the printer or it may be proved by an external system which allows personnel who are not at the printer to be alerted. The monitoring may be done by the printer or information about the deflection electrode current may be provided to an external system that performs the monitoring.

Further aspects of the invention and optional features are set out in the accompanying claims.

As noted above, the print head may be separable from the main body of the printer, and the term "printer" is used in the characterisations of the present invention to cover both an entire printer including a print head and a printer body without a print head.

BRIEF DESCRIPTION OF THE DRAWINGS

Embodiments of the present invention, given by way of non-limiting example, will be described with reference to the following drawings.

FIG. 1 shows an ink jet printer embodying the present invention.

FIG. 2 is a schematic top view of the main components in the print head of the printer of FIG. 1.

FIG. 3 is a schematic side view of the main components in the print head of the printer of FIG. 1.

FIG. 6 shows a voltage generator for a deflection electrode and a sensor arrangement for sensing the current flowing at the deflection electrode.

FIG. 7 shows an example of a hardware circuit for outputting a fault indication in response to a high input from the sensor arrangement.

FIG. 8 show a sensor arrangement for sensing voltage transients at a deflection electrode.

DETAILED DESCRIPTION OF EMBODIMENTS

Figure 4:
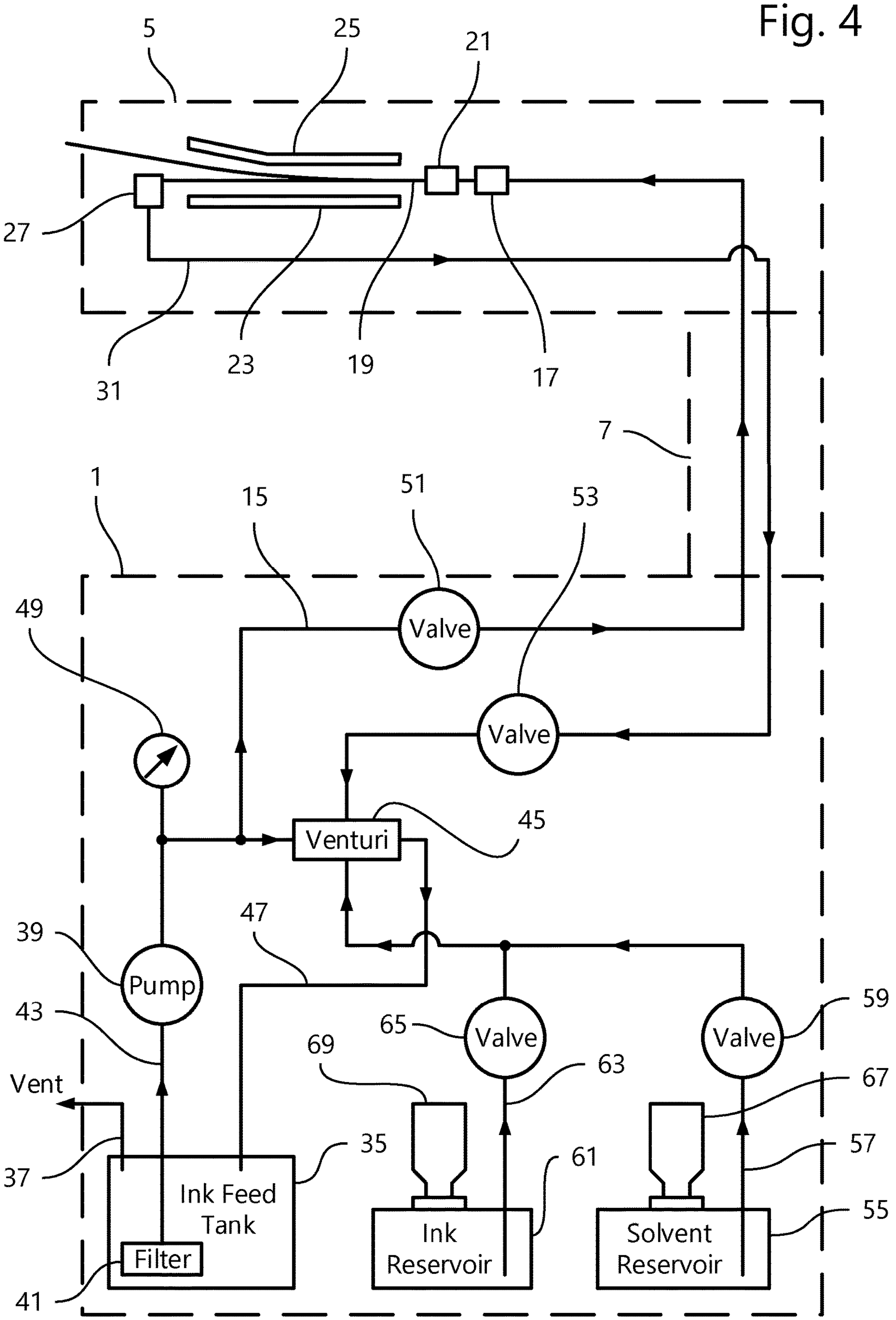
FIG. 4 shows simplified schematic diagram of the fluid system of the printer of FIG. 1.

FIG. 1 shows an electrostatic deflection type continuous ink jet printer. The printer forms a continuous jet of ink and has an arrangement of electrodes for charging drops of ink and deflecting the drops electrostatically in order to print a desired pattern. The main fluid and electrical components are housed within a printer body 1. An operator communicates with the printer via a touchscreen display 3. The ink jet is formed within a print head 5, which also includes the electrode arrangement for charging and deflecting the ink drops, and the print head 5 is connected to the printer body 1 by a flexible connection 7 known as a conduit or an umbilical. Drops of ink, deflected as necessary to create the desired pattern, travel from the print head 5 and strike the surface 9 of an object 11 conveyed past the print head 5, in order to print the desired pattern on the surface 9 of the object 11. The print head 5 and the umbilical 7 form a print head assembly that may be disconnectable from the printer body 1.

The printer is typically an industrial ink jet printer and is suitable to be used with a conveyor 13 that is external to the printer and conveys objects 11 past the print head to be printed onto. This is in contrast to a document printer that prints onto flat sheets, and which normally conveys the sheets itself rather than being used with a conveyor 13 that is external to the printer. The object 11 may be a manufactured product item, such as a bottle or can of drink, a jar of jam, a ready meal, or a carton containing multiple individual items. The desired pattern may comprise product information such a batch number or a "use by" date. The printer may print onto the object 11 from the side so that the ink jet travels in a direction generally across the conveyor, or from above so that the ink jet travels in a direction generally towards the conveyor, or from any other angle. For example, bottles are normally printed onto from the side whereas ready meals are normally printed onto from above. In FIG. 1 the printer is set up to print from the side and partially above.

FIG. 2 is a schematic top view and FIG. 3 is a schematic side view of the main components of the print head 5 in the region of the ink jet. The terms "top view" and "side view" represent conventional directions from which to view the print head on the assumption that the printer will print onto an object 11 from the side, and do not necessarily correspond to the orientation of the print head when in use. Pressurised ink, delivered from the printer body 1 through the umbilical 7, is provided via an ink feed line 15 to an ink gun (or nozzle) 17. The pressure of the ink drives it out of the ink gun 17 through a small jet-forming orifice to form an ink jet 19. Provided that pressurised ink is received by the ink gun 17 and any valves in the ink gun 17 are in the appropriate state, the ink jet 19 is formed continuously. Accordingly, this type of ink jet printer is known as a continuous ink jet printer, by contrast with a drop-on-demand printer in which a drop of ink is ejected only when a dot is to be printed.

Although the ink jet 19 leaves the ink gun 17 as a continuous unbroken stream of ink, it rapidly breaks into separate drops. The path of the ink jet passes through a slot in a charge electrode 21, which is positioned so that the ink jet 19 separates into drops while it is in the slot through the charge electrode 21. Other arrangements and other shapes of charge electrode 21 are possible, so long as the ink jet 19 is subject to the electric field of the charge electrode at the position where it separates into drops. The ink is electrically conductive and the ink gun 17 is held at a constant voltage (typically ground). Accordingly, any voltage applied to the charge electrode 21 induces a charge into the part of the ink jet 19 that is subject to the electric field in the slot of the charge electrode 21. As the ink jet 19 separates into drops, any such charge is trapped on the drops. In this way the amount of charge trapped on each drop can be controlled by the voltage on the charge electrode 21 and different amounts of charge can be trapped on different drops by changing the voltage on the charge electrode 21.

The ink jet 19 then passes between two deflection electrodes 23, 25. A large potential difference (typically several kilovolts, often 8 to 10 kV) is applied between the deflection electrodes 23, 25 to provide a strong electric field between them. Accordingly, the drops of ink are deflected by the electric field and the amount of deflection depends on the amount of charge trapped on each drop. In this way, each ink drop can be steered into a selected path.

As shown in FIG. 2, uncharged ink drops, which pass through the electric field without deflection, travel to a gutter 27 where they are caught. The gutter 27 is formed in an endpiece 29 of the print head 5. The endpiece 29, incorporating the gutter 27, is held at the same voltage (typically ground) as the ink gun 17 and removes the charge on any ink drops that reach it. Suction is applied to the inside of the gutter 27 by a gutter suction line 31, and so the ink received by the gutter 27 is sucked away and returned through the umbilical 7 to the printer body 1, for re-use. Drops of ink that are deflected by the field between the deflection electrodes 23, 25, so as to miss the gutter 27, leave the print head 5 and form printed dots on the surface 9 of the object 11.

The ink gun 17, the charge electrode 21, and the deflection electrodes 23, 25 are mounted on a baseboard 33 that ends at the endpiece 29. The gutter suction line 31 extends beneath the baseboard 33. The electrical connections for the charge electrode 21 and the deflection electrodes 23, 25 also extend beneath the baseboard 33, as shown in FIG. 3. The space above the baseboard 33 is closed by a removable print head cover. The space below the baseboard 33 is closed by the external body of the print head 5. The print head cover and the external body are not shown in FIGS. 2 and 3.

FIG. 4 is a simplified schematic diagram of a fluid system for the ink jet printer of FIG. 1. Ink is held in an ink feed tank 35 in the printer body 1. The ink feed tank 35 is the main ink tank of the printer. The interior of the ink feed tank 35 is held at atmospheric pressure by a vent 37. Ink is sucked out of the ink feed tank 35 by a pump 39, via a filter 41 and an ink supply line 43. The ink, pressurised by the pump 39, flows through a Venturi 45 and back to the ink feed tank 35 via an ink return line 47. A pressure transducer (pressure sensor) 49 is used to sense the ink pressure on the outlet side of the ink pump 39.

The ink feed line 15 is also connected to the outlet side of the ink pump 39 and receives pressurised ink. Thus the ink feed line 15 provides an ink feed path to supply pressurised ink from the ink pump 39 to the ink gun 17. An ink feed valve 51 controls the flow of ink along the ink feed line 15. The pump 39 can drive ink continuously through the Venturi 45 and back to the ink feed tank 35, even when the ink feed valve 51 prevents ink from flowing along the ink feed line 15. The flow of ink through the Venturi 45 generates suction and accordingly the Venturi acts as a suction source. The gutter suction line 31 is connected to a suction inlet of the Venturi 45 to receive suction which sucks ink from the gutter 27 through the umbilical 7 back to the printer body 1. The ink from the gutter suction line 31 is sucked into the Venturi 45 and returns to the ink feed tank 35 via the ink return line 47. Fluid flow in the gutter suction line 31 is controlled by a gutter valve 53.

Spare solvent is held in a solvent reservoir 55 which receives suction from the Venturi 45 through a solvent top-up line 57. If solvent needs to be added to the ink in the ink feed tank 35 to dilute the ink and correct its viscosity, a solvent top-up valve 59 in the solvent top-up line 57 is opened briefly. This allows the Venturi 45 to suck a small quantity of solvent from the solvent reservoir 55 into the ink flow through the Venturi 45. The solvent sucked into the Venturi 45 then passes into the ink feed tank 35 to dilute the ink.

Spare ink is held in an ink reservoir 61 which receives suction from the Venturi 45 through an ink top-up line 63. When the level of ink in the ink feed tank 35 becomes low, an ink top-up valve 65 in the ink top-up line 63 is opened. Ink is sucked out of the ink reservoir 61 by the Venturi 45 and is delivered to the ink feed tank 35 in a similar manner to the operation for topping up with solvent from the solvent reservoir 55.

The solvent reservoir 55 and the ink reservoir 61 are supplied from a solvent container 67 and an ink container 69 respectively, and the operator replaces the containers 67, 69 as necessary. In practice, it is not always necessary to provide the solvent reservoir 55 and the ink reservoir 61, and the respective top-up lines 57, 63 may be connected directly to the containers 67, 69.

Figure 5:
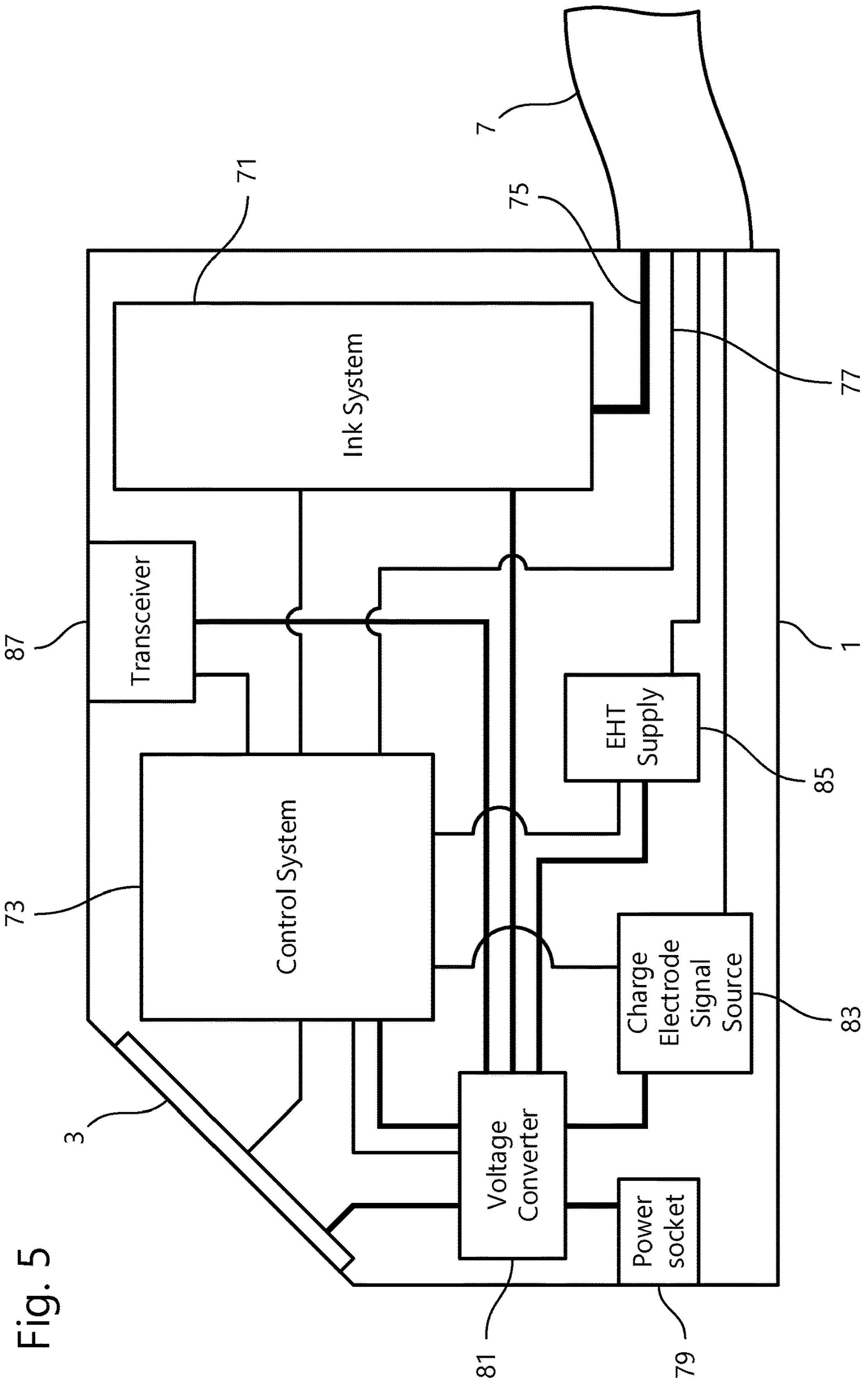
FIG. 5 shows schematically the main components inside the printer body of the printer of FIG. 1.

FIG. 5 shows schematically some of the components inside the printer body 1 of the printer. The printer has a printer body ink system 71, which includes the components in FIG. 4 that are shown inside the printer body 1. The printer body ink system 71 and other parts of the printer operate under the control of a control system 73. The control system 73, for example, sends control signals to the ink pump 39 and to the various valves, 51, 53, 59, 65 of the printer body ink system 71. The control system 73 receives outputs from the pressure sensor 49 and also from level sensors in the ink feed tank 35, the solvent reservoir 55 and the ink reservoir 61. The control system 73 also provides outputs to, and receives inputs from, the touchscreen display 3. Typically, the control system will include a processor such as a microprocessor and other electronic components as is well known in the art.

Fluid lines 75 connect the printer body ink system 71 to the print head 5 through the umbilical 7. These fluid lines will include the ink feed line 15, and the gutter suction line 29 shown in FIG. 4. Electrical lines 77 connect the control system 73 to the print head 5 via the umbilical 7. These electrical lines include for example a line for applying a drive signal to a piezoelectric crystal inside the ink gun 17 that applies the vibration to the ink in order to control the manner in which the ink jet 19 breaks into drops.

The printer receives electric power at a power socket 79, which is converted in a voltage converter 81 to the various voltages required internally within the printer. For example, the printer may be designed to receive 24 volt DC at the power socket 79, since power supplies for generating 24 volts DC from an electric mains supply are widely available. The voltage converter 81 uses the received 24 volt supply to generate the voltages required to power the electronics in the control system 73, which may for example be 5 volts. It also supplies power to a charge electrode signal source 83 and an EHT supply 85. The charge electrode signal source 83 operates under control of the control system 73 to generate the voltages (e.g. up to about 300 V) to be applied to the charge electrode 21 in the print head 5. The EHT supply 85 is arranged to generate a large negative voltage for one deflection electrode 23 and a large positive voltage for the other deflection electrode 25, typically around −4 kV and +4 kV respectively. The voltage converter 81 also supplies power to the printer body ink system 71 for driving ink system components such as the valves 51, 53, 59, 65 and the ink pump 39.

The printer body 1 also contains a transceiver 87 that enables the control system 73 to transmit data out of the printer and to receive data from outside the printer. The transceiver may transmit and receive wirelessly, e.g. by a radio connection to a router for communication with the Internet or a local intranet or by communication with a cellular telephone network, and/or it may transmit over a wired connection using for example a USB connection or an Ethernet connection.

The electrical system shown in FIG. 5 is simplified and in practice there will be other components which are not shown in FIG. 5.

During operation of the printer there is a substantial voltage difference (typically about 4 kV) between each of the deflection electrodes 23, 25 and the endpiece 29 incorporating the gutter 27. If ink drops are misdirected, for example owing to a momentary distortion of the ink jet, they may hit the gutter 27 or one of the deflection electrodes 23, 25. Additionally the impact of ink drops entering the gutter 27 may create a mist of very small ink drops in the region of the gutter and these may land on the gutter 27 or other parts of the endpiece 29, or on one of the deflection electrodes 23, 25. In this way, ink can build up on the surface of the gutter 27 or other parts of the endpiece 29, or on one of the deflection electrodes 23, 25, which can reduce the electrical separation between the endpiece 29 and the deflection electrodes 23, 25. Eventually this can lead to an arc discharge from one or both of the deflection electrodes 23, 25 to the gutter 27 or another part of the endpiece 29.

Because the voltages applied to the deflection electrodes 23, 25 are very high, a high resistance is provided in the electrical line that carries the deflection electrode voltages from the EHT supply 85 to the deflection electrodes 23, 25, or alternatively a high resistance is built in to the output of the EHT supply 85, in order to provide electrical safety. As a result, if a significant current flows through a deflection electrode 23, 25 e.g. owing to an arc discharge to the endpiece 29, voltage is dropped across the resistance and the voltage at the electrode reduces significantly. Additionally, the EHT supply 85 may be unable to maintain the correct output voltage if a significant current is drawn from it.

Contamination of the surface of the baseboard 33 can also lead to flow of electric current from a deflection electrode 23, 25 due to surface tracking. Contamination may e.g. be from drops of ink or from a failure to rinse the print head 5 properly after it has been cleaned with a cleaning solution. Depending on the location of the contamination, the surface tracking current may flow between the two deflection electrodes 23, 25, or between one of the deflection electrodes 23, 25 and another component, typically the endpiece 29 and the gutter 27 or the charge electrode 21 or other electrodes that may be present e.g. to sense charged drops in order to measure the speed of the ink jet. Tracking currents often increase over time, and so they can also lead to a voltage reduction at either or both of the deflection electrodes 23, 25.

A voltage reduction at one or both of the deflection electrodes 23, 25 will result in a distortion of the deflection field generated between the deflection electrodes 23, 25. If this occurs, the ink drops will not be deflected correctly and it is necessary to stop the printing operation of the printer. A sensing system is provided to detect when a current flows at either of the deflection electrodes 23, 25, leading to a voltage reduction, so as to enable the printer to be shut down automatically if this happens.

FIG. 6 shows schematically circuit for generating a high voltage to be applied to the positive deflection electrode 25 and a sensor for detecting any current drawn by the deflection electrode 25.

The EHT supply 85 comprises a Cockcroft Walton (Greinacher) generator, comprising a ladder of diodes 89 and capacitors 91 as shown in FIG. 6, to generate the positive high voltage to be supplied to the positive deflection electrode 25. The circuit shown in FIG. 6 is schematic and the actual numbers of diodes 89 and capacitors 91 may be different from the illustrated circuit. The ladder circuit is driven by an oscillating voltage induced in a secondary winding 93. As the voltage across the secondary winding 93 oscillates, the capacitors 91 are charged through the diodes 89 to generate a high positive voltage at the output of the ladder circuit. A ground connection at one end of the secondary winding 93 provides a voltage reference for the circuit.

The EHT supply 85 also comprises a second Cockcroft Walton (Greinacher) generator to generate the negative high voltage to be supplied to the negative deflection electrode 23. This is the same as the circuit shown in FIG. 6 except that the diodes 89 are reversed so that the oscillating voltage from the secondary winding 93 causes the capacitors 91 to become charged in the opposite direction as compared with the circuit of FIG. 6, so that the output high voltage is negative.

Once the capacitors 91 are all charged and the voltage at the deflection electrode 25 has stabilised, the circuit will draw no current from the ground connection unless there is a leakage of current from the deflection electrode 25. Therefore any arc discharge or tracking current from the electrode, which would lead to a loss of voltage at the electrode, can be monitored by monitoring current in the ground connection. This is done by providing a sensing resistor 95 in the line that connects the secondary winding 93 to ground. Any flow of current between the ladder circuit and ground will result in a voltage across the sensing resistor 95. Therefore the voltage at the end of the resistor 95 remote from ground (marked "sensor output" in FIG. 6) provides a measure of the amount of current flowing through the deflection electrode 25. Preferably a small capacitor 97 is connected in parallel with the sensing resistor 95 to short out high frequency noise and prevent spurious brief voltage spikes in the sensor output.

A similar sensing arrangement is provided in the ground connection for the Cockcroft Walton (Greinacher) generator used to generate the negative high voltage for the negative deflection electrode 23.

The sensor output voltage from the circuit of FIG. 6 is provided to the control system 73. The control system 73 treats the sensor output voltage as a fault parameter and a monitoring system in the control system 73 monitors the sensor output voltage. If the voltage meets a predetermined fault criterion (e.g. that the voltage exceeds a threshold level for more than a predetermined duration), a fault indication is generated and a controller of the control system 73 responds by shutting down the printer. In this case, the voltages applied to the deflection electrodes 23, 25 are immediately withdrawn so that the ink drops all travel to the gutter 27 regardless of the amount of charge trapped on each drop. This stops any uncontrolled deflection of the ink drops. The printer is then shut down following its normal shutdown routine.

The sensor output voltage may be monitored by a monitoring system implemented in the control system 73 in software. In this case, the sensor output voltage is provided to an A/D converter and the resulting digital value is input to a digital system in the control system 73. The fault indication may be provided by the operation of software and it may be responded to by the operation of software so that the fault indication is not provided as a signal outside a digital processing system in the control system 73.

Alternatively, the control system 73 may comprise a dedicated hardware monitoring system for the sensor output voltage, such as the trip circuit shown in FIG. 7. In this trip circuit the sensor output voltage is input to the non-inverting terminal of an operational amplifier 99. A voltage divider 101 defines a threshold voltage that is input to the inverting terminal of the operational amplifier 99. Provided that the voltage at the non-inverting terminal of the operational amplifier remains below the threshold voltage defined by the voltage divider 101, the output of the operational amplifier remains low. If the voltage provided to the non-inverting terminal by the sensor output rises above the threshold voltage, the output of the operational amplifier immediately goes high. This high voltage is latched in a latch circuit 103 and is output from the latch circuit 103 as a fault indication. The fault indication is provided to other parts of the control system as necessary to stop the printing operation of the printer. For example, it may be provided to an interrupt input of a processor in order to ensure that the control system 73 responds rapidly to the fault indication. The fault indication may also be connected directly to a circuit that removes the voltages from the deflection electrodes 23, 25.

The latch circuit 103 ensures that once a high voltage has been detected at the non-inverting input to the operational amplifier 99, the fault indication continues to be provided even after the voltage at the non-inverting terminal has fallen. The latch circuit can be reset by the control system 73 after the printing operation of the printer has been shut down.

In the circuit of FIG. 7, a resistor 105 and a capacitor 107 provided between the output of the operational amplifier 99 and the input to the latch circuit 103 ensure that the voltage received by the latch circuit only rises sufficiently to be latched, and the fault indication is only output, if the sensor output voltage remains above the threshold voltage for at least a minimum period of time.

FIG. 8 shows an alternative sensing arrangement that can be used instead of the sensing resistor 95 and capacitor 97 of FIG. 6. In FIG. 8, the sensor output is coupled via a capacitor 109 (e.g. 22 pF) to the line carrying the deflection electrode voltage from the EHT supply 85 to one of the deflection electrodes 23, 25. The sensor output is also connected to ground via a resistor 111 (e.g. 1 MΩ). In this arrangement the sensor output voltage represents voltage transients at the sensor electrode 23, 25, which in turn are caused by current transients. It will not detect the level of the voltage at the deflection electrode 23, 25, but arc discharges typically cause sudden transient changes in current and therefore sudden transient changes in voltage. These sudden changes will pass through the capacitor 109 and will appear at the sensor output. Therefore this circuit is effective to detect arc discharges from a deflection electrode and the sensor output voltage can be used as a fault parameter.

Figure 9:
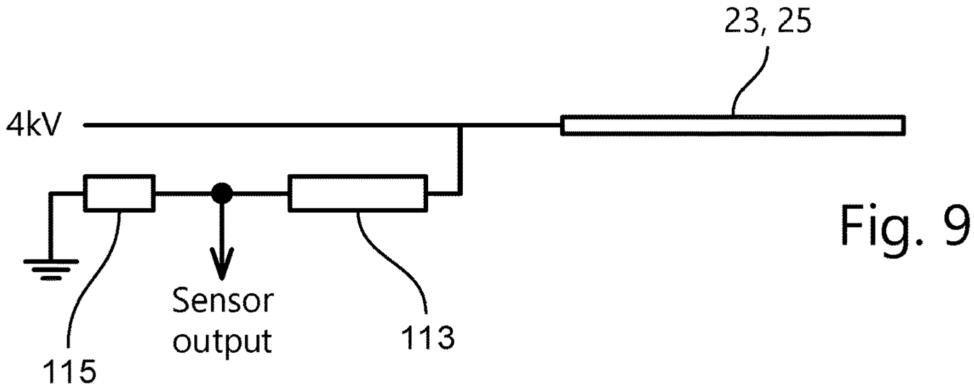
FIG. 9 shows a sensor arrangement for sensing the voltage at a deflection electrode.

In principle, it is possible to monitor the voltage level at the deflection electrodes 23, 25, e.g. by using a sensing arrangement as shown in FIG. 9, and use this as a fault parameter. In this case, sensor output is taken from a voltage divider made up of resistors 113 and 115 in a connection to ground from the line carrying the deflection electrode voltage from the EHT supply 85 to one of the deflection electrodes 23, 25. However, this arrangement is not preferred for two reasons. First, the voltage divider using resistors 113 and 115 will draw some current and therefore it may affect the voltage at the deflection electrode 23, 25. Second, in order to set the voltage level at the sensor output to a level that is compatible with the voltage requirements of electronic circuits, while being connected to approximately 4 kV at the deflection electrode, the value of resistor 113 to the EHT supply line must be about 1000 times the value of the resistor 115 to ground (transforming about 4 kV at the EHT supply line to about 4 V at the sensor output). This means that any variation in the voltage level at the EHT supply line will be transformed into much smaller a variation (about 1/1000 the size) in the voltage at the sensor output. Therefore the circuitry that receives the sensor output needs to be sensitive to very small changes in voltage.

Figure 10:
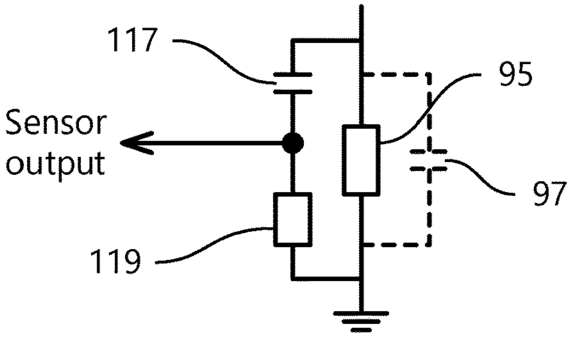
FIG. 10 shows a sensor arrangement for sensing transients in the current at a deflection electrode.

It is also possible to sense current transients, for example by connecting a further capacitor 117 and a further resistor 119 in parallel with the resistor 95 and optional capacitor 97 of FIG. 6, and taking the sensor output from between the further capacitor 117 and the further resistor 119, as shown in FIG. 10. However, this adds complexity compared to the arrangement of FIG. 6 and provides little benefit, and so is less preferred.

The nature of the fault parameter and the fault criterion are not important provided that they enable the monitoring system of the control system 73 to generate the fault indication reliably when it is necessary to stop printing operations owing to excess flow of current from either or both of the deflection electrodes 23, 25.

In addition to detecting a flow of current at one or both of the deflection electrodes that requires the printer to be shut down, the printer detects lower levels of current flowing at the deflection electrodes. Preferably the same sensing arrangement is used both to detect a flow of current that requires a shut down and to detect the lower levels of current, although separate sensing arrangements could be used if desired. A current level sensing arrangement, such as is shown in FIG. 6, is preferred to arrangements that sense transients because lower levels of current will generate smaller transients and so are harder to detect with transient sensing arrangements.

In the printer of the present embodiment, the sensor output representing the level of current at a deflection electrode 23, 25 is provided to the control system 73 which treats it as a warning parameter or processes it to generate a warning parameter from it. The monitoring system in the control system 73 determines whether the warning parameter meets a warning criterion. If the warning parameter meets the warning criterion, the monitoring system outputs a warning that a fault indication (trip event) is expected. The monitoring system may monitor the warning parameter by use of some or all of the components used to monitor the fault parameter or it may use entirely separate components. For example, the monitoring system may use the hardware system of FIG. 7 to monitor the fault parameter and use software to monitor the warning parameter, especially if the warning parameter is not the level of the sensor output but is the result of processing of the level of the sensor output, since such processing may also done in software following conversion of the sensor output level in an analog-to-digital converter.

The warning criterion can be met under circumstances in which the flow of current at the deflection electrode is higher than for normal operation with a clean print head but is lower than required to meet the fault criterion. For example, the fault criterion may be set up so that a fault indication is generated, and the printer is shut down, if the current at either of the deflection electrodes 23, 25 exceeds a threshold that is set somewhere between 10 μA and 14 μA. By comparison, if the print head is clean the deflection current indicated by individual samples might reach 1.8 μA but the average over one second will typically be below 0.5 μA. The warning criterion may be met if the average current over 1 second at either deflection electrode exceeds a threshold that is set somewhere between 2 μA and 4 μA. The average current over one second could be indicated by a 10-point moving average of values sampled from the sensor output every 100 milliseconds, and in this case the moving average may be regarded as the warning parameter.

In this way the warning criterion allows a warning of an impending trip event to be given when the amount of current flowing at the deflection electrode does not qualify as a trip event requiring shut down of the printer, but the current is higher than normal for a clean print head. The inventors have found that this situation arises some time before the occurrence of a trip event such as arcing to the gutter or a similar component. It is believed that the raised average deflection electrode current arises when the print head is dirty, usually in the form of a build-up of dried ink at a deflection electrode 23, 25 or at the gutter 27 or a nearby component, leading to pre-arcing flows of current or very brief micro-arcs, probably owing to the reduction in the clearance distance between one of the deflection electrodes 23, 25 and the gutter 27 or the endpiece 29. These incidents of higher-than-normal deflection electrode current typically do not themselves create a need to stop printing operations but have been found to precede and give warning of an arcing event that is sufficient to cause the fault indication to be generated and printing operations to be stopped.

In experiments, the warning gave advance notice of a subsequent trip event (leading to generation of a fault indication and the shutting down of the printing operation) by a time ranging from several tens of minutes to over an hour. This allows the operator to take remedial action in a more planned and controlled manner than would be possible if the printer experienced a trip event without warning, and shut down following generation of the fault indication. The remedial action taken will depend on the circumstances of the operator, and may for example involve a controlled shut down of the conveyor line at which the printer is operating to allow the print head to be cleaned, a brief controlled shut down of the conveyor line to allow the printer to be exchanged for a reserve printer, or in cases where any shut down of the conveyor line is undesirable there could be an operation to exchange printers while the product flow is temporarily diverted without stopping the conveyor line. These operations will usually be much less disruptive for the operator than an unexpected shut down of the printer.

The warning criterion does not have to be based on the average current at a deflection electrode over 1 second. However, some averaging is preferred in order to eliminate the effect of noise and avoid the warning criterion being met by a single random high current sample value. Any averaging should not extend over so long a period that the values from a brief flow of high current are so diluted by the preceding or following low current values that the brief flow of high current becomes hard to detect. There may be some variation, depending on the design of the print head, in the pattern of brief flows of high current that precede an arc event requiring that printing operations are stopped. However, it is believed that in general such warning brief flows of current will typically last from 2 to 5 seconds. Therefore an average taken over 1 to 2 seconds, or another smoothing process that gives most weight to a period of no longer than 2 seconds, should allow brief high current warning events to be detected. An average taken over more than 4 seconds, or any smoothing process that gives most weight to a period longer than 4 seconds, is not preferred because it would become hard to detect the shortest high current events using averaging or smoothing over such a period.

Figure 11:
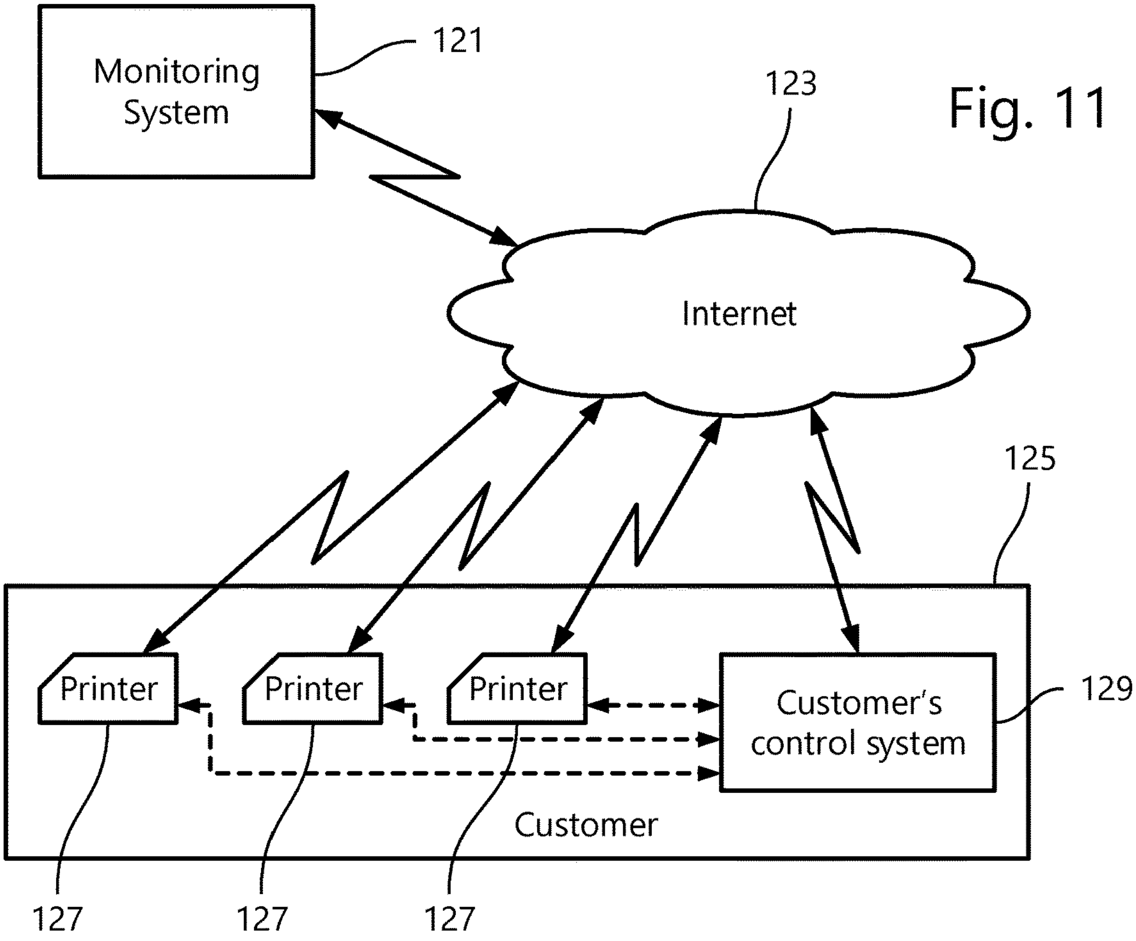
FIG. 11 shows an arrangement for receiving and monitoring data sent by one or more printers.

The control system 73 may be arranged to implement the warning of an anticipated trip event by providing a warning output on the touchscreen display 3, possibly accompanied by an audio warning if the printer body 1 is equipped with an audio transducer. However, it is often the case that an operator sets the printer running and does not stay nearby, so that a warning output at the printer is not always useful. Therefore it is preferred that the warning is also sent to the transceiver 87 to be transmitted out of the printer. As shown in FIG. 11, the transceiver may transmit the warning, preferably together with an indication of the printer's identity, to a remote monitoring system 121 if the business 125 using the printer 127 is a customer of the monitoring business that operates the monitoring system 121. As shown in FIG. 11, this transmission will typically be via the Internet 123. The monitoring business can then respond to the warning, either automatically or by use of human staff, by informing the customer 125 that the print head of the printer 127 needs to be cleaned. This can allow the customer 125 to be notified in a pre-arranged and reliable manner even if there is no-one near to the printer who might notice a warning output at the printer itself. The indication of the identity of the printer, transmitted by the printer 127 with the warning, allows the monitoring system 121 to know which printer the warning relates to.

As shown in FIG. 11, the customer business 125 may use several printers 127. As shown in broken lines in FIG. 11, the printers 127 may be set up to send warnings to the customer's own control system 129 for the site where the printers 127 are in use, either instead of or as well as sending warnings to the remote monitoring system 121. Transmission from the printers 127 to the customer's control system 129 may be via dedicated cables (e.g. Ethernet) or may be via an intranet. This allows the customer to operate a central system to monitor multiple printers 127, possibly over multiple sites. The remote monitoring system 121 or the customer's control system 129 may send data to an application that runs on one or more mobile devices such as smartphones, enabling a supervisor to receive warnings in real time as they move around the customer's site.

Preferably the printer of the present embodiment also writes the values of the warning parameter (in this case the 10-point moving average of the sensor output sample values), and/or the fact that a warning has been generated, into a log. Additionally or alternatively this data may be written into a log at a system (the monitoring system 121 or the customer's control system 129) that receives data from the printer. The existence of this information in a log may assist a service engineer during fault finding.

Figure 12:
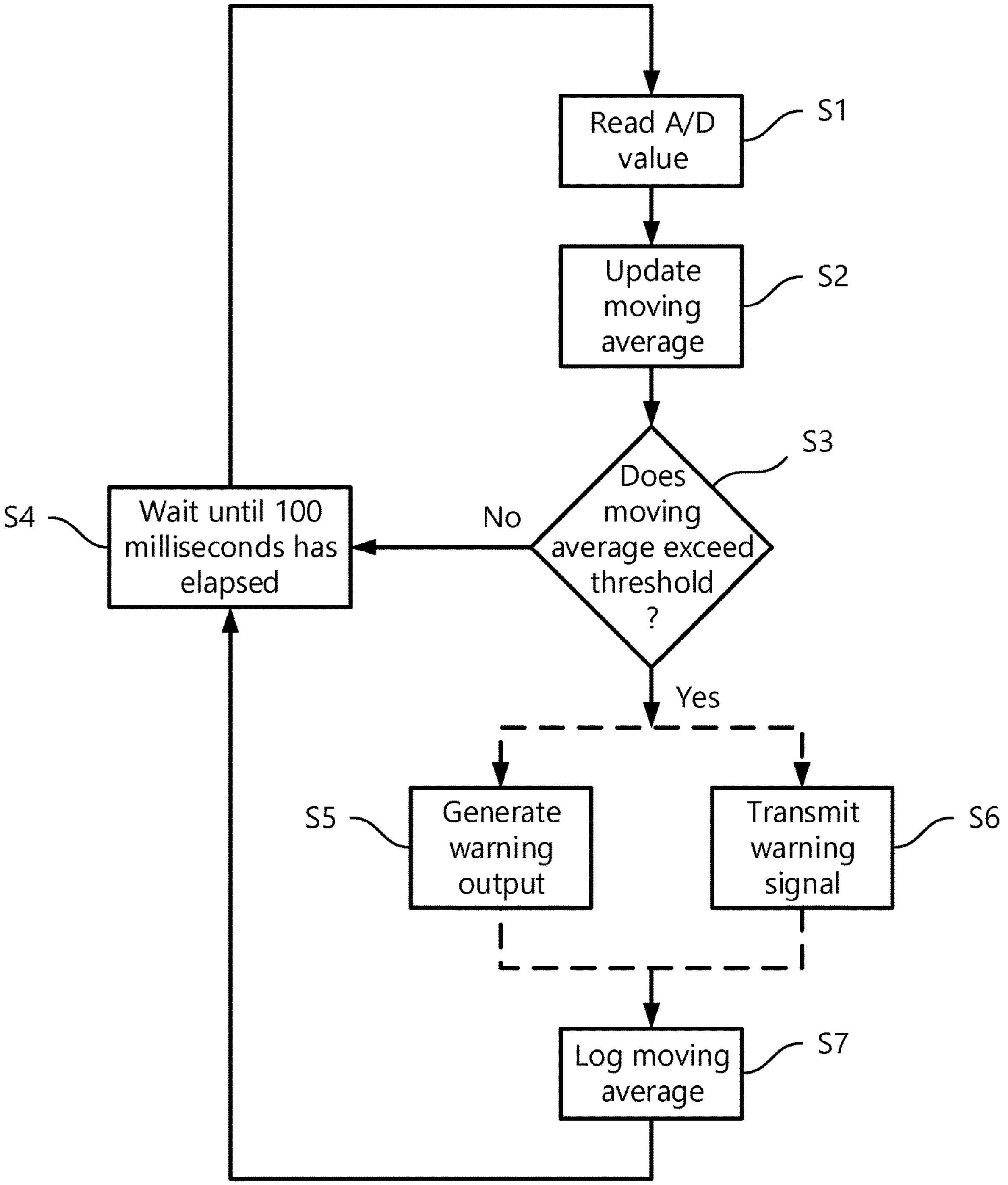
FIG. 12 is a flow diagram of a process for monitoring a warning parameter in a printer and outputting a warning if a warning criterion is met.

FIG. 12 is a flow diagram for an example of the process for monitoring the sensor output and generating the warning in software in a system that converts the sensor output voltage into a digital value by an analog-to-digital converter.

In step S1, the value output by the analog-to-digital converter is read. In step S2, the moving average is updated. If the moving average is calculated with equal weights given to each sample used, the step of updating the average may comprise discarding the oldest value and including the value read in step S1.

In step S3, the updated moving average from step S2 is compared with a threshold value that represents the warning criterion. If the moving average from step S2 does not exceed the threshold value, the process passes to step S4 in which the system waits until 100 milliseconds (or whatever other sampling interval has been set) has elapsed since step S1 was performed. Then the process passes back to step S1 for the next sensor output sample value to be read from the analog-to-digital converter.

The numerical value used as the threshold value in step S3 will be chosen depending on: (a) the level of current at the deflection electrode 23 or 25 that has been selected as the threshold current for the warning criterion; (b) the value of the sensing resistor 95 in FIG. 6, which determines what level of current is represented by any particular voltage at the sensor output; and (c) the conversion scale of the analog-to-digital converter, which determines what voltage is represented by any particular number read from the digital-to-analog converter.

Although steps S2 and S3 refer to the moving average, they may in fact calculate and use a moving sum together with a numerical threshold value in step S3 that represents the current level of the warning criterion multiplied by the number of sample values used. This implements the same logic as calculating and using the moving average and may be more efficient or convenient to program. Any other procedure that has the same logical effect may be used.

If the moving average from step S2 does exceed the threshold value in step S3, this corresponds to a decision that the warning should be given. Accordingly the process passes to step S5 and/or step S6 to implement this decision. In step S5, a visible and/or audible warning is output at the printer. In step S6 the transceiver 87 is used to transmit a warning signal, indicating that a printer shut-down due to a trip event is anticipated, to the remote monitoring system 121 and/or the customer's control system 129, as discussed above with reference to FIG. 11.

The procedure then moves to step S7, in which the value of the moving average (or the moving sum or other logically equivalent value) is entered in the printer's log. The process then passes to step S4. In this procedure, the moving average (or equivalent value) is only entered into the log if it exceeds the threshold value and a warning is given. If it is desired to log all values of the moving average (or equivalent), step S7 may be moved to come before step S3. This provides more information in the printer's log, but greatly increases the amount of data that needs to be stored in the log.

Preferably the sensor output representing the level of current flowing at a deflection electrode 23, 25 is also treated as a second warning parameter by the control system 73 or the control system 73 processes it to generate a second warning parameter from it. The monitoring system in the control system 73 determines whether the second warning parameter meets a second warning criterion. The monitoring system also outputs a warning of an expected shut-down of printing operations if the second warning parameter meets the second warning criterion. The monitoring system may monitor the second warning parameter by use of some or all of the components used to monitor the first warning parameter or it may use entirely separate components.

Like the first warning criterion, the second warning criterion can be met under circumstances in which the flow of current at the deflection electrode is higher than for normal operation with a clean print head but is lower than required to meet the fault criterion. However, the second warning parameter and/or the second warning criterion are defined so that the second warning criterion is met in response to an increased flow of current at one of the deflection electrodes 23, 25 over a longer time period than is required for the first warning criterion to be met.

For example, if the first warning criterion is met when the average current over 1 second at either deflection electrode exceeds a threshold, the second warning criterion may be met when the average current over 30 seconds exceeds a threshold which may be the same threshold as is used in the first warning criterion or a different threshold. The average current over 30 seconds could be indicated by a 300-point moving average of values sampled from the sensor output every 100 milliseconds, and in this case the moving average may be regarded as the second warning parameter.

The second warning criterion allows a warning to be given when the amount of current at the deflection electrode does not qualify as a trip event requiring shut down of the printer, but the current is higher than normal for a clean print head for an extended period that is longer than the maximum expected length of a pre-arcing current flow or very brief micro-arc. Such longer term flows of current at a deflection electrode usually indicate the existence of "tracking" in which current flows over a surface. The flow of a tracking current over a surface typically reduces the electrical resistance of the track of the current over time so that the current level increases. Therefore once a tracking current is established it will usually increase until it reaches a level at which the fault indication is given and the printing operations of the printer are shut down.

Accordingly the second warning criterion also enables a warning to be given in advance of a likely trip event leading to printing operations being shut down. In the case of a warning given in response to meeting the second warning criterion, the likely cause of the impending trip event is surface contamination of the baseboard 33 of the print head 5. This can result, for example, if the print head has been cleaned with a cleaning solution which was not rinsed off adequately. Subsequently the dried cleaning solution itself contaminates the print head 5.

The distinction between the first and second warning criteria allows the warnings provided to the printer operator to include more specific and helpful information such as a suggestion of which part of the print head may be most in need of cleaning. Additionally, such information may be useful to a service engineer who wishes to establish why a particular printer has a high number of incidents of excessive current at the deflection electrodes. For example, a high number of warnings in response to the second warning criterion would suggest to the engineer that it may be useful to remind the operator to rinse off the cleaning solution after cleaning the print head, whereas a high number of warnings in response to the first warning criterion would suggest to the engineer that an investigation might be required into why ink splashes are accumulating on the print head components.

The second warning criterion does not have to be based on the average current at a deflection electrode over 30 seconds. However, the averaging should extend over a period that is long enough for the values from a brief flow of high current, sufficient to meet the first warning criterion, to be sufficiently diluted that the second warning criterion is not met if the current values that precede and following the brief flow of high current are typical of a clean print head. As mentioned above, it is believed that in general such warning brief flows of current will typically last from 2 to 5 seconds. Therefore an average taken over 15 or 30 seconds, or another smoothing process that gives most weight to a period of no shorter than 15 seconds, should allow brief high current warning events to be excluded.

An average taken over less than 10 seconds, or any smoothing process that gives most weight to a period shorter than 10 seconds, is not preferred because it would become hard to prevent the longest pre-arcing or micro arc high current events from leading to the second warning criterion being met. Since tracking currents are typically continuous there is theoretically no upper limit to the averaging period used for the second warning parameter, but in practice the monitoring system should respond to the existence of a tracking current reasonably quickly and so it is preferred not to use a period of longer than two minutes.

If the same level of current at the deflection electrode is used both for the first warning criterion and for the second warning criterion, a warning in response to the first warning criterion will be provided whenever a warning in response to the second warning criterion is provided. This may be confusing. In order to avoid this, a warning in response to the first warning criterion may be withdrawn or countermanded if it is immediately followed by a warning in response to the second warning criterion. Alternatively the first warning criterion may be modified to include a requirement that the second warning criterion has not been met, possibly with a delay before the first warning criterion is regarded as being met in order to check whether the second warning criterion is met immediately after the level of current at the deflection electrode reaches the threshold level. This helps to avoid a warning in response to the first warning criterion being provided, and possibly then immediately withdrawn or countermanded, in the case that the current at the deflection electrode has in fact risen due to a tracking current. Additionally or instead of a delay before the first warning criterion is regarded as being met, the threshold current required by the second criterion may be slightly lower than the threshold current required by the first criterion. This allows a steadily rising current at a deflection electrode, typical of a tracking current, to cause the second warning criterion to be met before the first warning criterion is met thereby enabling the system to avoid triggering an unnecessary warning in response to first warning criterion.

Figure 13:
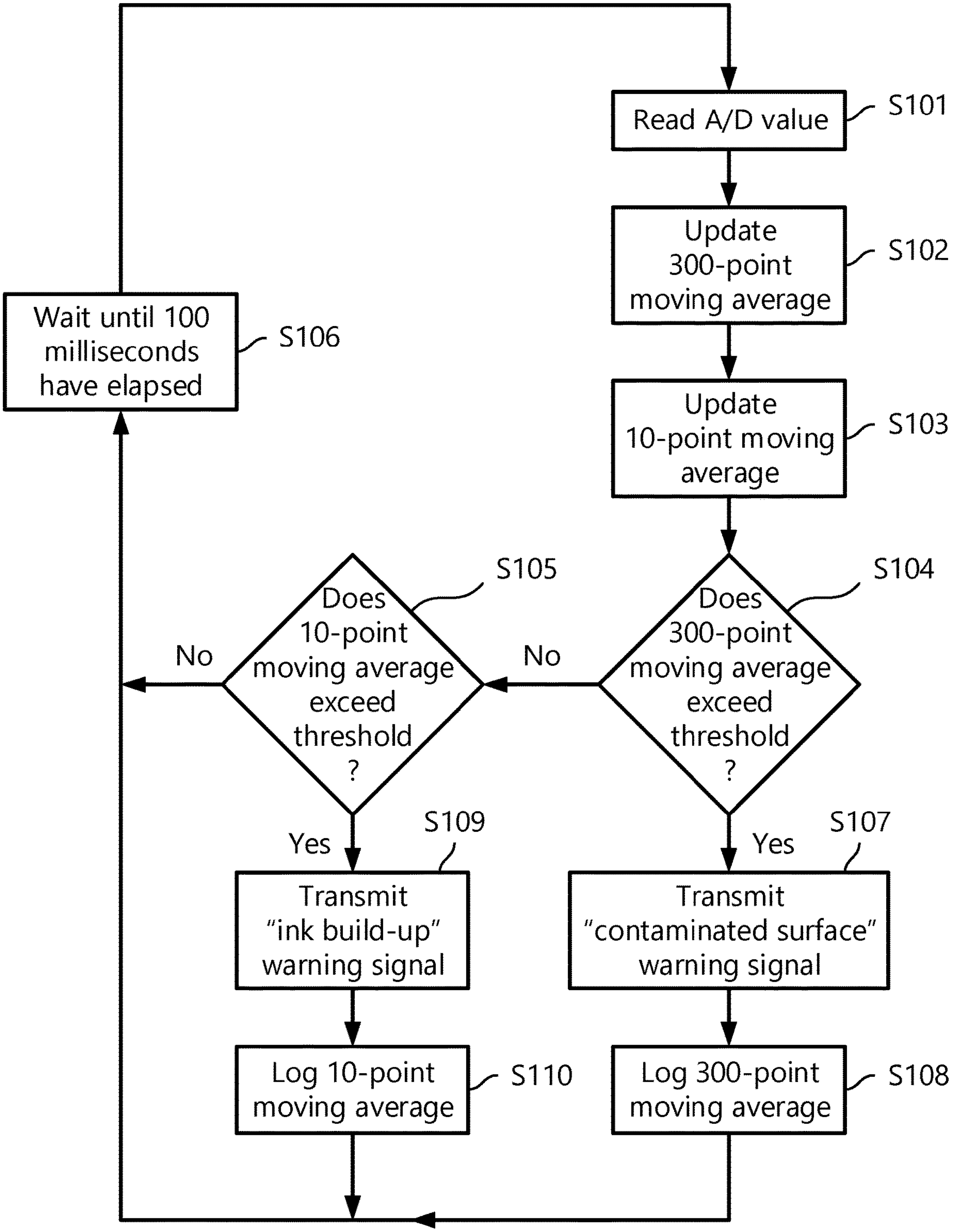
FIG. 13 is a flow diagram of a process for monitoring first and second warning parameters in a printer and outputting a first or a second warning if a respective first or a second warning criterion is met.

FIG. 13 is a modification of the flow diagram of FIG. 12, to enable the system to provide warnings both in response to the first warning criterion and in response to the second warning criterion.

In step S101, the value output by the analog-to-digital converter is read. This step is the same as step S1 in FIG. 12. In step S102, the 300-point moving average (the second warning parameter) is updated and in step S103, the 10-point moving average (the first warning parameter) is updated, in the same way as the moving average is updated in step S2 in FIG. 12.

In step S104, the updated 300-point moving average from step S102 is compared with a threshold value that represents deflection electrode current level that is the second warning criterion. If the moving average from step S102 does not exceed this threshold value, the process passes to step S105. In step S105, the updated 10-point moving average from step S103 is compared with a threshold value that represents the deflection electrode current level in the first second warning criterion. If the moving average from step S103 does not exceed this threshold value, the process passes to step S106.

In step S106 the system waits until 100 milliseconds (or whatever other sampling interval has been set) has elapsed since step S101 was performed. Then the process passes back to step S101 for the next sensor output sample value to be read from the analog-to-digital converter.

If the 300-point moving average from step S102 does exceed the threshold value in step S104, this corresponds to a decision that a warning (anticipated printing shut-down due to surface contamination) should be given in response to the second warning criterion.

Accordingly the process passes to step S107 to implement this decision. In step S107 the transceiver 87 is used to transmit a warning signal, indicating that a printer shut-down is expected to occur due to a trip event caused by surface contamination of the print head, to the remote monitoring system 121 and/or the customer's control system 129, as discussed above with reference to FIG. 11. The procedure then moves to step S108, in which the value of the 300-point moving average is entered in the printer's log. The process then passes to step S106.

If the 300-point moving average from step S102 does not exceed the threshold value in step S104, but the 10-point moving average from step S103 does exceed the threshold value in step S105, this corresponds to a decision that a warning (anticipated printing shut-down due to dried ink building up on print head components) should be given in response to the first criterion. Accordingly the process passes to step S109 to implement this decision. In step S109 the transceiver 87 is used to transmit a signal, indicating that a printer shut-down is expected to occur due to a trip event caused by a build-up of dried ink on print head components, to the remote monitoring system 121 and/or the customer's control system 129, as discussed above with reference to FIG. 11. The procedure then moves to step S110, in which the value of the 10-point moving average is entered in the printer's log. The process then passes to step S106.

In step S105, the decision whether or not to issue a warning is taken based solely on comparing the 10-point moving average with the threshold value representing the threshold deflection electrode current level in the first warning criterion. However, step S105 is only reached if the 300-point moving average does not exceed the threshold level for the second warning criterion in step S104. Therefore the first warning criterion that is implemented in this flow diagram is that the 10-point moving average deflection electrode current exceeds the threshold deflection electrode current level AND the second warning criterion is not met.

As discussed with reference to FIG. 12, steps 107 and S108 may be accompanied or replaced by a step of outputting a visible and/or audible warning at the printer although this is not shown in FIG. 13.

As discussed with reference to FIG. 12, steps S108 and S110 may be moved to come before step S104 if it is desired to log all values of the moving averages (or equivalent).

In the embodiments discussed above, a monitoring system in the control system 73 monitors the first warning parameter and, if used, the second warning parameter. However, in an alternative embodiment the warning parameter(s) are not monitored in the printer. Instead, the printer 127 uses the transceiver 87 to send the values of the warning parameter to the remote monitoring system 121 and/or to the customer's control system 129, and the monitoring is done outside the printer.

Figure 14:
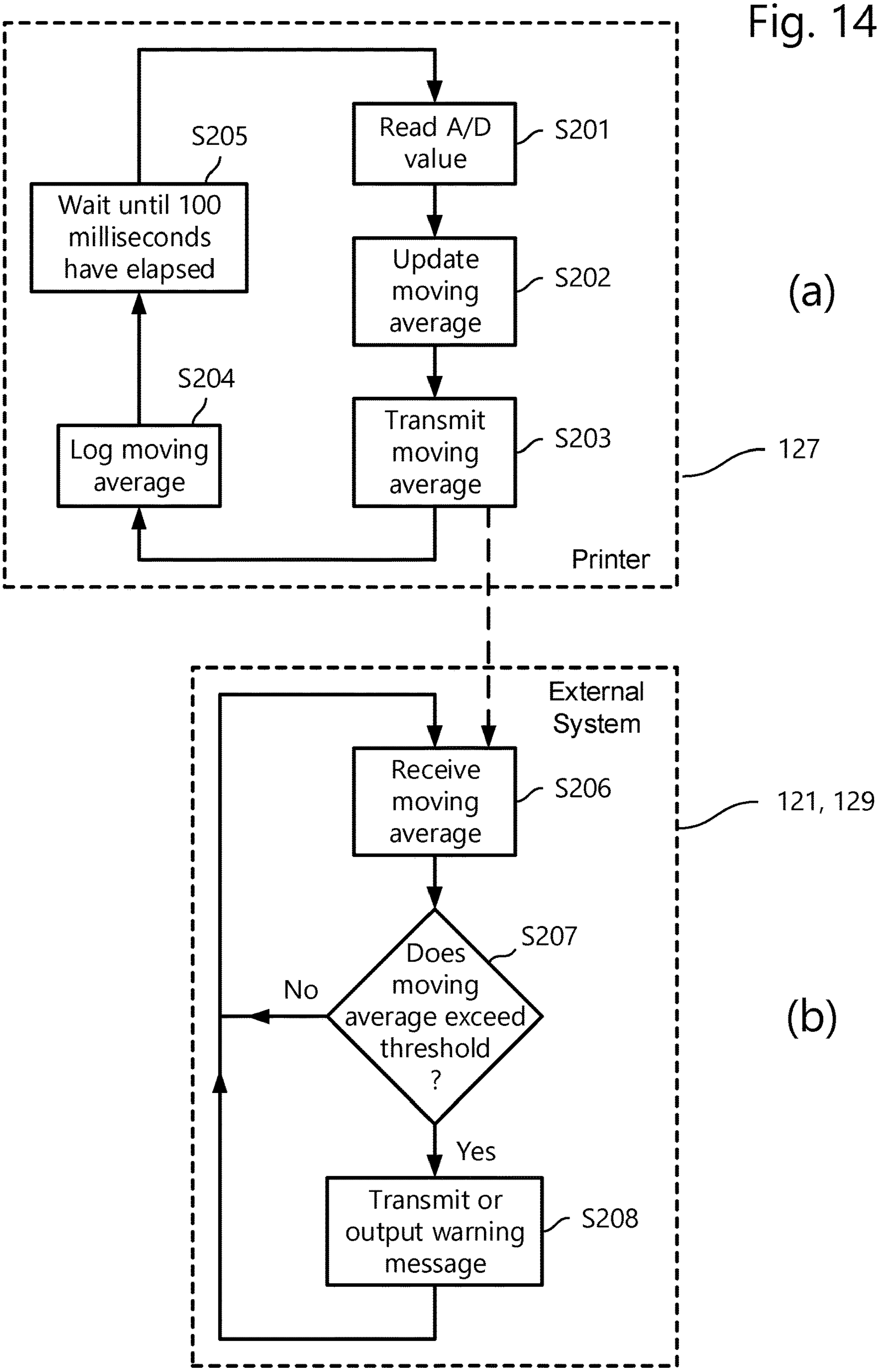
FIG. 14 is a flow diagram of a process (a) for generating a warning parameter in a printer and transmitting it to an external system, and (b) for monitoring the warning parameter in the external system and outputting a warning.

FIG. 14 provides an example of a procedure to implement this alternative. Part (a) of FIG. 14 is a flow diagram of the process at the printer 127 and part (b) of FIG. 14 is a flow diagram of the process at the external system 121 or 129 that receives the data sent by the printer. In FIG. 14, there is just one warning parameter, which is a moving average, as in FIG. 12.

At the printer 127, the value output by the analog-to-digital converter is read in step S201 and the moving average is updated in step S202. These steps are the same as steps S1 and S2 in FIG. 12. Then in step S203 the transceiver 87 is used to transmit the updated value of the moving average to the external system 121 or 129. The procedure then moves to step S204, in which the value of the moving average is entered in the printer's log. The process then passes to step S205 in which the system waits until 100 milliseconds (or whatever other sampling interval has been set) has elapsed since step S201 was performed. Then the process passes back to step S201 for the next sensor output sample value to be read from the analog-to-digital converter.

In step S206 the external system 121 or 129 receives the moving average value that has been transmitted by the printer 127 in step S203. The transmission of data from the printer 127 to the external system 121 or 129 is indicted in FIG. 14 by the broken line arrow from step S203 to step S206.

In step S207, the updated moving average received in step S206 is compared with a threshold value that represents the warning criterion. If the moving average from step S206 does not exceed the threshold value, the process returns to step S206 to await the next moving average value from the printer 127.

If the moving average transmitted by the printer 127 does exceed the threshold value in step S207, this corresponds to a decision that a warning of an anticipated shut-down should be given. Accordingly the process passes to step S208 to implement this decision. If the process of FIG. 14(*b*) is being performed at the remote monitoring system 121, a warning message is sent to the customer 125 in step S208. If the process of FIG. 14(*b*) is being performed at the customer's control system 129, a message may be sent to the printer operator or another part of the system, or a visible and/or audible warning may output at the customer's control system 129 instead.

It is also possible for the printer to transmit the sensor output values, provided by the analog-to-digital converter, to the external system 121 or 129 instead of the moving average. The moving average can then be calculated and updated at the external system 121 or 129. It is possible to regard the sensor output values as the first and second warning parameters, and to include the calculation of the moving averages as part of the first and second warning criteria.

Although FIG. 14 only uses one moving average and one warning criterion, it is also possible for two moving averages and two warning criteria to be handled by the external system 121, 129 using data sent from the printer 127, in a manner analogous to the procedure of FIG. 13.

The use of two warning criteria allows the printer or external system to distinguish different causes of an anticipated shut-down or printing operations at the printer, and therefore allows the warning to contain more detailed information. This is also possible in other ways. For example, the sensor arrangements are usually provided for each deflection electrode 23, 25 and the sensor outputs can be processed separately. This makes it possible to identify which of the deflection electrodes 23, 25 has a raised level of electrical current and allows the warning to contain information based on this, for example by including a more detailed recommendation of which part of the print head most needs to be cleaned.

The embodiments discussed above are given by way of example and should not be regarded as limiting the scope of the claims.

The invention claimed is:

1. An electrostatic deflection continuous ink jet printer comprising:

a deflection electrode; and a controller configured to:

(i) cause an automatic ceasing of printing in response to an excessive current flowing at the deflection electrode; and (ii) cause an output of a warning that the printer is predicted to be likely to automatically cease printing in response to a predetermined amount and/or pattern of current flowing at the deflection electrode that is more than normal current flowing at the deflection electrode if components of a print head of the printer are clean and not excessive current leading to the printer automatically ceasing printing.

2. An electrostatic deflection continuous ink jet printer according to claim 1, wherein the warning is output, at least in part, by transmitting a signal to a system external to the printer.

3. An electrostatic deflection continuous ink jet printer according to claim 1, wherein the warning is output, at least in part, as a visible and/or audible warning at the printer.

4. An electrostatic deflection continuous ink jet printer according to claim 1, wherein the electrostatic deflection continuous ink jet printer is arranged to output the warning that the printer is predicted to be likely to automatically cease printing in response to the predetermined amount and/or pattern of current flowing at any one of a plurality of deflection electrodes that is more than normal current flowing at the respective deflection electrode if the components of the print head of the printer are clean and not excessive current leading to the printer automatically ceasing printing.

5. An electrostatic deflection continuous ink jet printer according to claim 4, wherein the warning that the printer is predicted to be likely to automatically cease printing in response to the predetermined amount and/or pattern of current flowing at any one of a plurality of deflection electrodes that is more than normal current flowing at the respective deflection electrode if the components of the print head of the printer are clean but is not excessive current leading to the printer automatically ceasing printing includes information about which deflection electrode or electrodes have the amount and/or pattern of current and/or information indicating a part of the print head of the printer that should be cleaned.

6. An electrostatic deflection continuous ink jet printer according to claim 1, wherein the warning is output in response to current smoothed over a period of time.

7. An electrostatic deflection continuous ink jet printer according to claim 6, wherein a first said warning is output in response to current smoothed over a first period of time and a second said warning is output in response to current smoothed over a second period of time that is greater than the first period of time.

8. An electrostatic deflection continuous ink jet printer according to claim 7, wherein the first said warning is output only if it is not outputting the second said warning.

9. An electrostatic deflection continuous ink jet printer according to claim 1 comprising:

a high-voltage supply system for providing a high voltage to the deflection electrode in a print head of the electrostatic deflection continuous ink jet printer;

a monitoring system arranged to monitor at least one fault parameter indicative of the current drawn by the said deflection electrode, and output a fault indication in the case that the said at least one fault parameter meets a predetermined fault criterion; and a controller arranged to respond to the fault indication by shutting down printing operations of the printer or by removing the said high voltage from the deflection electrode, thereby causing the printer to cease printing;

wherein the monitoring system is arranged to monitor at least one warning parameter indicative of a property of the current drawn by the said deflection electrode and, in the case that the said at least one warning parameter meets a predetermined warning criterion, output a warning that an output of the fault indication is anticipated, the warning being the warning that the printer is predicted to be likely to automatically cease printing.

10. A system for monitoring an electrostatic deflection continuous ink jet printer comprising:

a controller configured to:

(i) receive data from the electrostatic deflection continuous ink jet printer indicating a current flowing at a deflection electrode of the electrostatic deflection continuous ink jet printer;

(ii) cause an automatic ceasing of printing from the electrostatic deflection continuous ink jet printer in response to a determination by the controller that the data indicates an excessive current; and (iii) respond, by outputting cause an output of a warning that the electrostatic deflection continuous ink jet printer is predicted to be likely to automatically cease printing in response to a determination by the controller that the data indicates that an amount and/or pattern of current at the deflection electrode meets a predetermined criterion and the data does not indicate excessive current to cause the automatic ceasing of printing from the electrostatic deflection continuous ink jet printer.

11. A system according to claim 10, wherein the controller is arranged to receive data from the electrostatic deflection continuous ink jet printer indicating current flowing at each of a plurality of deflection electrodes of the electrostatic deflection continuous ink jet printer and to respond, by outputting a warning that the printer is predicted to be likely to automatically cease printing in response to a determination by the controller that the data indicates that the amount and/or pattern of current at any one of the plurality of deflection electrodes meets a predetermined criterion.

12. A method of operating an electrostatic deflection continuous ink jet printer comprising:

providing the electrostatic deflection continuous ink jet printer comprising a deflection electrode and a controller;

automatically ceasing printing, via the controller, in response to an excessive current flowing at the deflection electrode; and outputting, via the controller, a warning that the printer is predicted to be likely to cease printing in response to a predetermined amount and/or pattern of current flowing at the deflection electrode that is (i) more than normal current flowing at the deflection electrode if components of the printer are clean but is (ii) not more than an excessive current that leads to the printer automatically ceasing printing.

13. A method according to claim 12, wherein outputting the warning comprises outputting the warning, at least in part, by transmitting a signal to a system external to the printer.

14. A method according to claim 12, wherein outputting the warning comprises outputting the warning, at least in part, as a visible and/or audible warning at the printer.

15. A method according to claim 12, further comprising outputting a warning that the printer is predicted to be likely to automatically cease printing in response to a predetermined amount and/or pattern of current flowing at any one of a plurality of deflection electrodes that is more than normal current flowing at the respective deflection electrode if components of the printer are clean and not excessive current that leads to the printer automatically ceasing printing.

16. A method according to claim 15, wherein the warning that the printer is predicted to be likely to automatically cease printing in response to the predetermined amount and/or pattern of current flowing at any one of the plurality of deflection electrodes that is more than normal current flowing at the respective deflection electrode if components of the printer are clean and not excessive current that leads to the printer automatically ceasing printing includes information about which deflection electrode or electrodes have the said amount and/or pattern of current and/or information indicating a part of the printer that should be cleaned.

17. A method according to claim 12, further comprising outputting the warning in response to current smoothed over a period of time.

18. A method according to claim 17, further comprising outputting a first said warning in response to current smoothed over a first period of time and outputting a second said warning in response to current smoothed over a second period of time that is greater than the first period of time.

19. A method according to claim 18, further comprising outputting the first said warning only if the second said warning it is not being output.

20. A method according to claim 17, wherein the current is smoothed by taking a moving average.

* * * * *